(12) United States Patent
Kato et al.

(10) Patent No.: US 7,767,355 B2
(45) Date of Patent: Aug. 3, 2010

(54) FUEL CELL STACK WITH DUMMY CELL

(75) Inventors: Hideo Kato, Saitama (JP); Katsumi Hayashi, Saitama (JP); Shigeru Inai, Saitama (JP); Ryo Jinba, Saitama (JP); Masahiko Sato, Saitama (JP); Yohei Hidaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1375 days.

(21) Appl. No.: 10/877,466

(22) Filed: Jun. 25, 2004

(65) Prior Publication Data

US 2004/0265667 A1     Dec. 30, 2004

(30) Foreign Application Priority Data

Jun. 26, 2003    (JP)    ............... 2003-182837

(51) Int. Cl.
| | |
|---|---|
| H01M 8/02 | (2006.01) |
| H01M 8/24 | (2006.01) |
| H01M 2/14 | (2006.01) |
| H01M 2/00 | (2006.01) |

(52) U.S. Cl. .................. 429/456; 429/512; 429/469
(58) Field of Classification Search .................. 429/26, 429/32, 34–35, 38, 22
See application file for complete search history.

(56) References Cited

U.S. PATENT DOCUMENTS

| | | | |
|---|---|---|---|
| 2001/0021470 A1* | 9/2001 | May et al. ............. | 429/44 |
| 2002/0177019 A1* | 11/2002 | Aoto et al. ............. | 429/22 |
| 2003/0031915 A1* | 2/2003 | Diez et al. ............. | 429/38 |
| 2003/0077501 A1* | 4/2003 | Knights et al. .......... | 429/38 |
| 2003/0215693 A1* | 11/2003 | Asai et al. ............. | 429/38 |
| 2006/0032242 A1* | 2/2006 | TeGrotenhuis et al. ..... | 62/93 |

FOREIGN PATENT DOCUMENTS

| | | |
|---|---|---|
| JP | 8-130028 | 5/1996 |
| JP | 10-228918 | 8/1998 |

OTHER PUBLICATIONS

Japanese Office Action for Application No. 2003-182837, dated Sep. 18, 2007—English Translation.

* cited by examiner

*Primary Examiner*—Dah-Wei D Yuan
*Assistant Examiner*—Claire L Rademaker
(74) *Attorney, Agent, or Firm*—Lahive & Cockfield, LLP; Anthony A. Laurentano

(57) ABSTRACT

A fuel cell stack 10 includes a stacked structure 14 composed of a plurality of electricity-generating cells stacked successively, and dummy cells arranged at both ends in a stacking direction of the stacked structure 14. Each dummy cell 16 each includes a conductive plate 52 and first and second metallic separators 54, 56 which sandwich the conductive plate 52. The conductive plate 52 is formed of a metallic plate having substantially the same shape as that of the electrolytic membrane electrode assembly 22. The first and second metallic separators 54, 56 are structured in the same manner as the first and second metallic separators 24, 26 of the electricity-generating cell 12.

7 Claims, 8 Drawing Sheets

FUEL CELL STACK WITH DUMMY CELL

BACKGROUND OF THE INVENTION

1. Field of the Invention

The present invention relates to a fuel cell stack including a stacked structure composed of a plurality of electricity-generating cells each having a membrane electrode assembly with a pair of electrodes arranged on both sides of the electrolyte, the membrane electrode assembly being sandwiched by separators.

2. Description of the Related Art

In general, a solid polymer electrolyte fuel cell constitutes an electricity-generating cell in which an electrolytic membrane electrode assembly (membrane electrode assembly) are sandwiched by separators, the electrolytic membrane electrode assembly having an anode side electrode and a cathode side electrode opposed on both sides of an electrolytic membrane (electrolyte) of a high-polymer ion-exchange membrane (cation exchange membrane). Such a kind of electricity generating cell is used as a fuel cell stack by alternately stacking a prescribed number of the electrolytic membrane electrode assemblies and separators.

In this electricity-generating cell, the fuel gas supplied to the anode side electrode, e.g. gas containing mainly hydrogen (hereinafter also referred to as "hydrogen-contained gas") is ionized on an electrode catalyst, and the ionized gas is moved to the cathode side electrode through an electrolyte. The electrons produced during said processes are extracted by an external circuit so as to be used in direct electric energy form. Additionally, since an oxidizer gas, for instance, gas containing mainly oxygen or air (hereinafter referred to as "oxygen-containing gas") is supplied to the cathode side electrode, water can be produced under the reaction of hydrogen ions, electrons and oxygen with one another.

Meanwhile, the fuel cell stack includes electricity-generating cells that are likely to cause a temperature reduction due to the external heat dissipation in comparison of other electricity-generating cells. For example, the electricity-generating cell (hereinafter referred to as an end cell) located at a distal end in a stacking direction shows a remarkable temperature reduction owing to large heat dissipation from a power extracting plate (collector) for collecting charges created by the respective electricity-generating cells, or an end plate which is provided for holding the stacked electricity-generating cells.

As regards the fuel cell stack, the following drawback has been reported. Namely, owing to such temperature reduction, the distal end cell is likely to cause condensation as compared with the electricity-generating cells of which location are in the central portion of the fuel electrode stack, which ends up deterioration of discharging of the produced water, and as the result said temperature reduction deteriorates the electricity-generating performance. Particularly, there is a problem such that when the fuel cell stack starts up in an environment below the temperature of freezing, the water produced at the end cell might be frozen so that the temperature of the distal end cell cannot be risen, thereby leading to the voltage drop.

In order to overcome this kind of drawback, a solid-state polymer electrolyte fuel cell has been proposed which is provided with an end cell 1 as shown in FIG. 8. In the end cell 1, an electrolytic membrane electrode assembly 2 is sandwiched by separators 3 and 4. The electrolytic membrane electrode assembly 2 has a fuel electrode $2b$ and an oxidizer electrode $2c$ placed on both sides of a PE membrane $2a$. The separator 3 has a groove $3a$ for feeding a fuel gas, which is located on the one surface opposite to the fuel electrode $2b$, as well as a groove $3b$ for coolant, which is located on the surface opposite to the one surface.

The outer separator 4 constituting the end cell 1 has a groove $4a$ for feeding the fuel gas, which is located on the one surface opposite to the fuel electrode $2b$, however, it does not have a groove for coolant located on the surface opposite to the one surface as the separator 3 has. Thus, the separator 4 adopts the structure which is designed not to be cooled so much that the end cell 1 can be prevented from being excessively cooled by the coolant.

[Patent Reference No. 1]
JP-A-8-130028 (paragraphs [0053]-[0055], FIG. 9)

As described above, Patent Reference No. 1 discloses a structure to warm up the entire electricity-generating portion through self-heating caused by electric generation of the fuel cell, which can also prevent the condensation at the end cell 1 as the result of excessive cooling caused by the coolant.

However, particularly, in the case where the fuel cell is actuated in an environment below the temperature of freezing, the cell temperature must be raised rapidly to the temperature where the water is produced without being frozen. However, the structure disclosed in Patent Reference No. 1 is not enough to cope with such a situation.

Specifically, in the case where the fuel cell is actuated in an environment below the temperature of freezing, blocking the path for a reactive gas flow, which is caused by the produced water being frozen, is likely to occur within the electrodes that is constituting the electrolytic membrane electrode assembly. In this case, the reactive gas diffusing path is blocked, whereby the cell voltage drop is induced. In order to overcome such a drawback, temperature of the electrode must be swiftly raised to 0° C. or higher. However, it is not possible for the structure disclosed in Patent Reference No. 1 to maintain the electrode temperature at 0° C. or higher. This brings about another problem such that self-heating of the cell cannot be functioning any more due to said abrupt voltage drop of the end cell.

SUMMARY OF THE INVENTION

One of the objects of the present invention resides at solving the above problem, and provide a fuel cell stack which can prevent voltage drop due to the time lag of temperature-rising of an end cell, and this invention gives excellent low-temperature operating characteristic in a simple and economical structure.

The fuel cell stack according to the first aspect of the present invention includes a stacked structure composed of a plurality of electricity-generating cells each having an membrane electrode assembly with a pair of electrodes arranged on both sides of the electrolyte, the membrane electrode assembly being sandwiched by separators. In this structure, a dummy cell is arranged at at least one end in a stacking direction of the stacked structure. The dummy cell includes a conductive plate, corresponding to the membrane electrode assembly of the electricity-generating cell, which is sandwiched by the separators with the structure same as that of the electricity-generating cell. The dummy cell is arranged to be adjacent to the electricity-generating cell (hereinafter referred to as an end cell) which constitutes at least one of the ends of the stacked structure.

As described above, the dummy cell without employing the membrane electrode assembly does not produce any water through the electricity being generated. Thus, the dummy cell itself can be functioning as a heat-insulating layer so as to prevent effectively preventing the time lag of temperature-rising at an end cell which is operating at a low temperature and voltage drop thereof. In addition, thanks to the dummy cell having the separators same as those which the electricity-generating cell have, it is possible to manufacture the entire fuel cell stack more economically than the case of producing the same with using a dedicated heat-insulating plate.

In the fuel cell stack described in the second aspect of this invention, a coolant flow path is formed among the plurality of electricity-generating cells, whereas a heat-insulating space is formed on behalf of the coolant flow path between the electricity-generating cell arranged at the end of the stacked structure and the dummy cell. This configuration effectively prevents the temperature fall at the end cell particularly when the cell stack is actuated, and further improvement can be expected for the low-temperature actuating characteristic.

Further, in the fuel cell stack described in the third aspect of this invention, a coolant flow path is formed among the plurality of electricity-generating cells, whereas a coolant flow path having a flow rate limiting mechanism is provided between the end cell and the dummy cell.

During the normal operation of the fuel cell stack, the coolant supplied between the dummy cell and end cell mainly cools down the end cell. Therefore, the provision of the flow rate limiting mechanism makes it possible to prevent the end cell, which is located adjacent to the dummy cell, from being cooled excessively, which improves the low-temperature actuating characteristic and cooling characteristic during the normal operation.

In the above case, the flow rate limiting mechanism may be formed by a narrow width communicating portion to be located at an inlet or outlet portions of the coolant flow path, or a filling member which is formed in such a way to make the opening sectional area at the coolant flow path of the dummy cell to be narrower as compared with that of the coolant flow path between the electricity-generating cells. As the result, limiting the flow rate of the coolant can be secured by such a simple configuration.

In the fuel cell stack described in another aspect of this invention, the conductive plate has a higher electric resistance than that of the separators so that the conductive plate generates more heat which is caused by the current flow when each electricity-generating cell is operated. Therefore, the end cell can be heated in favorable manner so that the time lag of temperature-rising at the end cell can be prevented.

DESCRIPTION OF THE PREFERRED EMBODIMENTS

Figure 1:
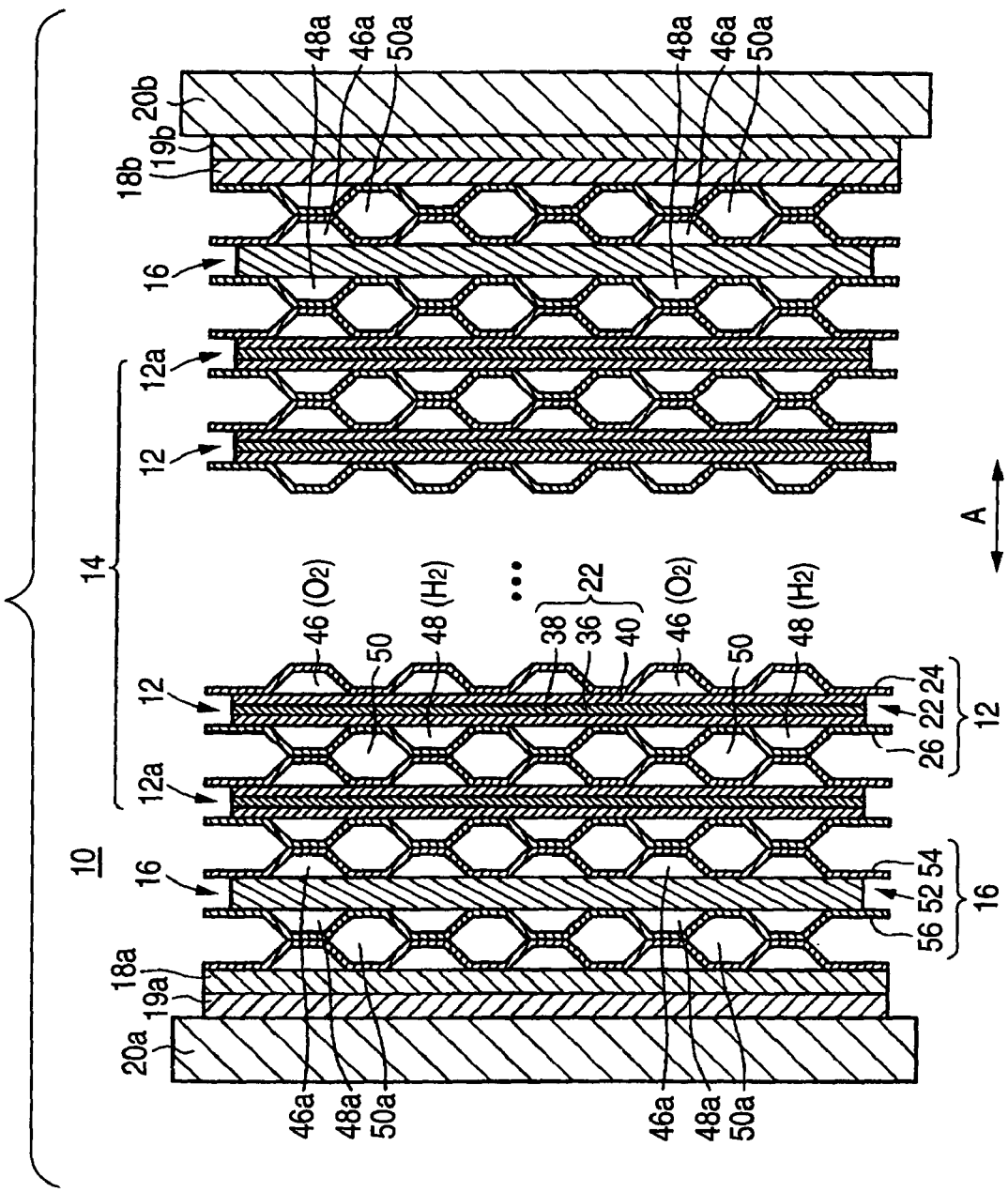
FIG. 1 is a schematic sectional view of a fuel cell stack according to a first embodiment of the present invention.

FIG. 1 is a schematic sectional view of a fuel cell stack 10 according to a first embodiment of the present invention.

The fuel cell stack 10 includes a plurality of electricity-generating cells 12 which are stacked in a direction of arrow A to constitute a stacked structure. The electricity-generating cells arranged at the ends of the stacked structure 14 are hereinafter referred to as end cells 12a.

At at least one end of the stacked structure 14 in the stacking direction, however, in this first embodiment, the dummy cells 16 are arranged at both ends. Also provided at outside each dummy cell 16 are a negative electrode terminal plate 18a and a positive electrode terminal plate 18b, insulating plates 19a, 19b and end plates 20a and 20b, which are arranged successively. By tightening the end plates 20a, 20b with tie rods (not shown), the fuel cell 10 can be assembled.

Figure 2:
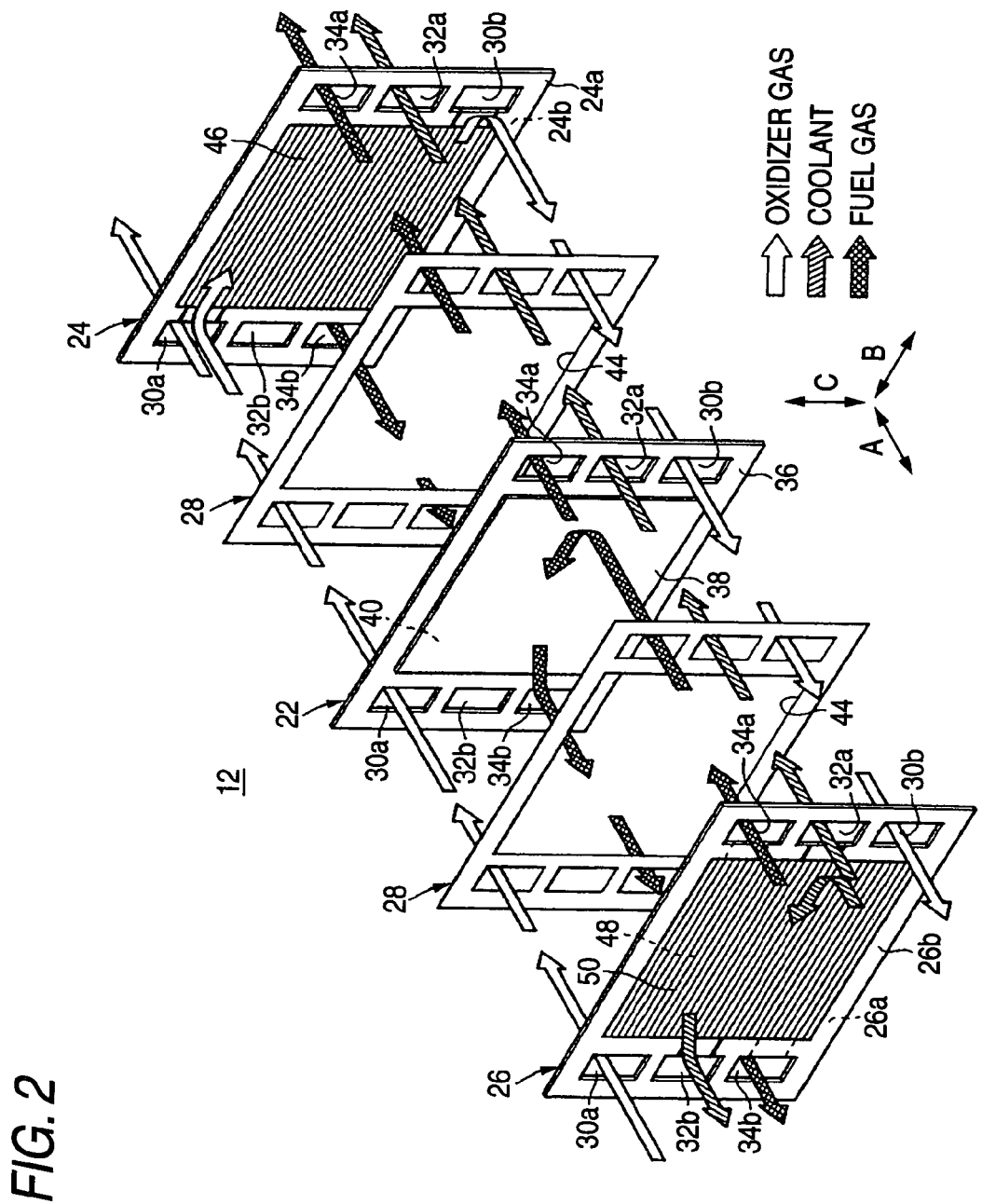
FIG. 2 is an exploded perspective view for explaining an electricity-generating cell constituting the fuel cell stack.

As can be seen from FIG. 2, the electricity-generating cell 12 includes an electrolytic membrane electrode assembly (membrane electrode assembly) 22 and first and second metallic separators 24 and 26 which sandwich the electrolytic membrane electrode assembly 22. Between the electrolytic membrane electrode assembly 22 and the first and second metallic separators 24, 26, sealing members 28, such as a gasket, are arranged to cover the periphery of communicating holes which will be described later and the outer periphery of the electrode plane (electricity-generating plane).

At the one end edge in a direction of arrow B of the electricity-generating cell 12, an oxidizer gas supplying communicating hole 30a for supplying an oxidizer gas, e.g. oxygen containing gas, a coolant discharging communicating hole 32b for discharging a coolant and a fuel gas discharging communicating hole 34b for discharging a fuel gas, e.g. hydrogen containing gas are arranged in a direction of arrow C (vertical direction) to communicate with one another in a direction of arrow A which is the stacking direction.

At the other end edge in a direction of arrow B of the electricity-generating cell 12, a fuel gas supplying communicating hole 34a for discharging the fuel gas, a coolant supplying communicating hole 32a for supplying the coolant, and an oxidizer gas supplying communicating hole 30b for discharging an oxidizer gas, e.g. oxygen containing gas are arranged in a direction of arrow C (vertical direction) to communicate with one another in a direction of arrow A.

The electrolytic membrane electrode assembly 22 includes a solid-state polymer electrolytic membrane 36 in which a perfluorosulfonic acid thin membrane is impregnated with water and an anode side electrode and a cathode side electrode which sandwich the solid-state polymer electrolytic membrane 36 (see FIGS. 1 and 2).

The anode side electrode 38 and cathode side electrode 40 each includes a gas diffusing layer of e.g. carbon paper and an electrode catalytic layer in which porous carbon particles carrying a platinum alloy on the surface are uniformly applied to the surface of the gas diffusing layer. The electrode catalytic layers are bonded to both sides of the solid-state polymer electrolytic membrane 36 so that they are opposed to each other to sandwich the solid-state polymer electrolytic membrane 36. At the central region of each sealing member 28, an opening 44 is formed so as to face to the anode side electrode 38 and cathode side electrode 40.

As seen from FIG. 2, on the face 24a on the side of the electrolytic membrane electrode assembly 22 of the first metallic separator 24, an oxidizer gas flow path 46 is arranged to communicate with the oxidizer gas supplying communicating hole 30a and the oxidizer gas discharging communicating hole 30b. The oxidizer gas flow path 46 is formed, for example, between a plurality of grooves extending in an direction of arrow B and the cathode side electrode 40.

On the face 26a on the side of the electrolytic membrane electrode assembly 22 of the second metallic separator 26, fuel gas flow path 48 is arranged to communicate with the fuel gas supplying communicating hole 34a and the fuel gas discharging communicating hole 34b. The fuel gas flow path 48 is formed, for example, between a plurality of grooves extending in an direction of arrow B and the anode side electrode 38.

Between the face 24b of the first metallic separator 24 and the face 26b of the second metallic separator 26, a coolant flow path 50 is formed to communicate with the coolant supplying communicating hole 32a and the coolant discharging communicating hole 32b. The coolant flow path 50 is formed integrally with extending in a direction of arrow B by overlapping a plurality of grooves formed in the first metallic separator 24 and those formed in the second metallic separator 26.

Figure 3:
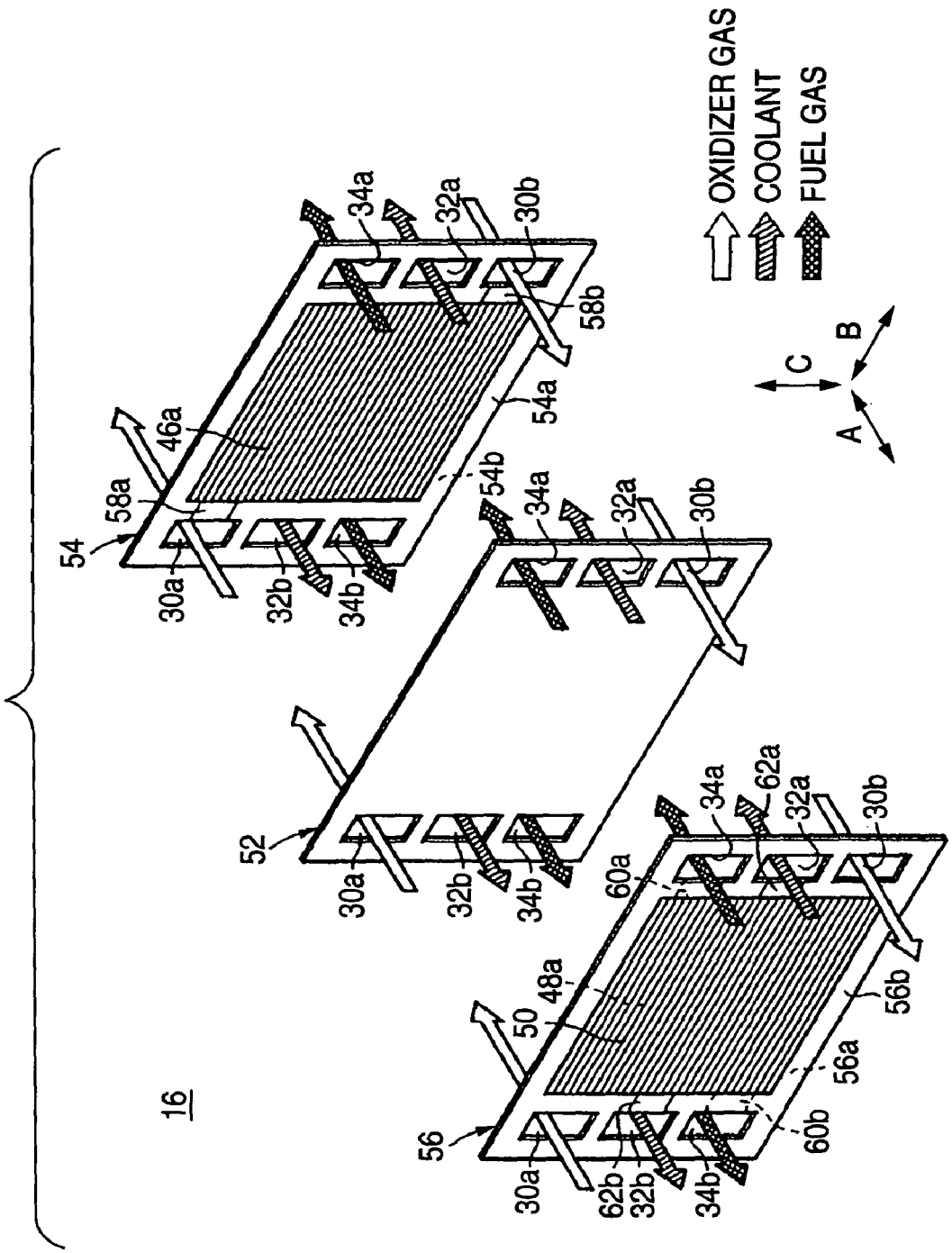
FIG. 3 is an exploded perspective view for explaining a dummy cell constituting the fuel cell stack.

As seen from FIGS. 1 and 3, the dummy cell 16 includes a conductive plate 52 corresponding to the electrolytic membrane electrode assembly 22 and first and second separators 54, 56 which sandwich the conductive plate 52. The conductive plate 52 is formed of e.g. a metallic plate, and in the same shape as that of the electrolytic membrane electrode assembly 22.

The first and second metallic separators 54, 56 are formed in the same manner as the first and second metallic separators 24, 26 of the electricity-generating cell 12. Actually, the first and second metallic separators 24, 26 are employed as the first and second metallic separators 54, 56.

On the face 54a of the first metallic separator 54, sheet-like shielding members 58a, 58b are arranged at the regions of communicating the oxidizer gas supplying communicating hole 30a and oxidizer gas discharging communicating hole 30b with the oxidizer gas flow path 46a. The oxidizer gas flow path 46a is formed as a closed heat-insulating space. On the face 56a of the second metallic separator 56, sheet-like shielding members 60a, 60b are arranged at the regions of communicating the fuel gas supplying communicating hole 34a and fuel gas discharging communicating hole 34b with the fuel gas flow path 48a. The fuel gas flow path 48a is formed as the closed heat-insulating space.

On the faces 54b, 56b of the first and second metallic separators 54, 56, sheet-like shielding members 62a, 62b are arranged at the regions of communicating the coolant supplying communicating hole 32a and coolant discharging communicating hole 32b with the coolant flow path 50a. The coolant flow path 50a is formed as the closed heat-insulating space.

An explanation will be given to the operation of the fuel cell stack 10 configured in the manner described above.

As seen from FIG. 3, within the fuel cell stack 10, the stacked structure 14 composed of a plurality of stacked electricity-generating cells is subjected to the feeding of the fuel gas such as hydrogen containing gas, oxidizer gas which is the oxygen-containing gas such as air and coolant such as pure water, ethylene glycol, oil, and so on.

Thus, as seen from FIG. 2, in each electricity-generating cell 12, the fuel gas is introduced from the fuel gas supplying communicating hole 34a into the fuel gas flow path 48 of the second metallic separator 26 and the fuel gas thus introduced moves along the anode side electrode 38 which constitutes the electrolytic membrane/electrode 22. The oxidizer gas is introduced from the oxidizer gas is introduced from the oxidizer gas supplying communicating hole 30a into the oxidizer gas flow path 46 of the first metallic separator 24. The oxidizer gas thus introduced moves along the cathode side electrode 40 which constitutes the electrolytic membrane electrode assembly 22.

In this way, in the electrolytic membrane electrode assembly 22, the fuel gas supplied to the anode side electrode 38 and the oxidizer gas supplied to the cathode electrode 40 are consumed within the electrode catalytic layer through electrochemical reaction, thereby generating electricity.

Next, the fuel gas supplied to the anode side electrode 38 and consumed there is discharged along the fuel gas discharging communicating hole 34b in a direction of arrow A. Simultaneously, the oxidizer gas supplied to the cathode side electrode 40 and consumed there is discharged along the oxidizer gas discharging communicating hole 30b in the direction of arrow A.

The coolant supplied to the coolant supplying communicating hole 32a is introduced into the coolant flow path 50a between the first and second metallic separators 24, 26. The coolant thus introduced flows in a direction of arrow B. The coolant, after having cooled the electrolytic membrane electrode assembly 22, is discharged from the coolant discharging communicating hole 32b.

In this case, in the first embodiment, each of the dummy cells 16 arranged at both ends of the stacked structure 22 in the stacking direction includes the conductive plate 52 corresponding to the electrolytic membrane electrode assembly 22 and the first and second metallic separators 54, 56 which are the same as the first and second metallic separators 24, 26 of the electricity-generating cell 12.

In this way, the dummy cell 16 does not employ the electrolytic membrane electrode assembly 22 whereby water is not produced by electricity that is generated when the fuel cell stack 10 is actuated.

Therefore, the dummy cell 16 itself is functioning as a heat-insulating layer, thereby effectively preventing the time lag of temperature-rising of the end cell 12a when actuated at a low temperature and voltage drop of the end cell 12a.

In addition, the dummy cell 16 employs the first and second metallic separators 54, 56 which are the same as the first and second metallic separators 24, 26 of the electricity-generating cell 12.

For this reason, as compared with the case of using a dedicated heat-insulating plate, the entire fuel cell stack 10 can be economically made.

Further, between the end cell 12a and dummy cell 16, the heat-insulating space corresponding to the coolant flow path 50a is formed (see FIG. 1). This effectively prevents temperature fall at the end cell 12a at the low temperature activation, which further improves the low-temperature actuating performance.

In this case, in the dummy cell, the oxidizer gas flow path 46a and the fuel gas flow path 48a, which are not supplied with the oxidizer gas and fuel gas, serving as the heat-insulating space. Therefore heat-insulation of the end cell 12a becomes more secured so as to prevent its temperature fall effectively.

Figure 4:
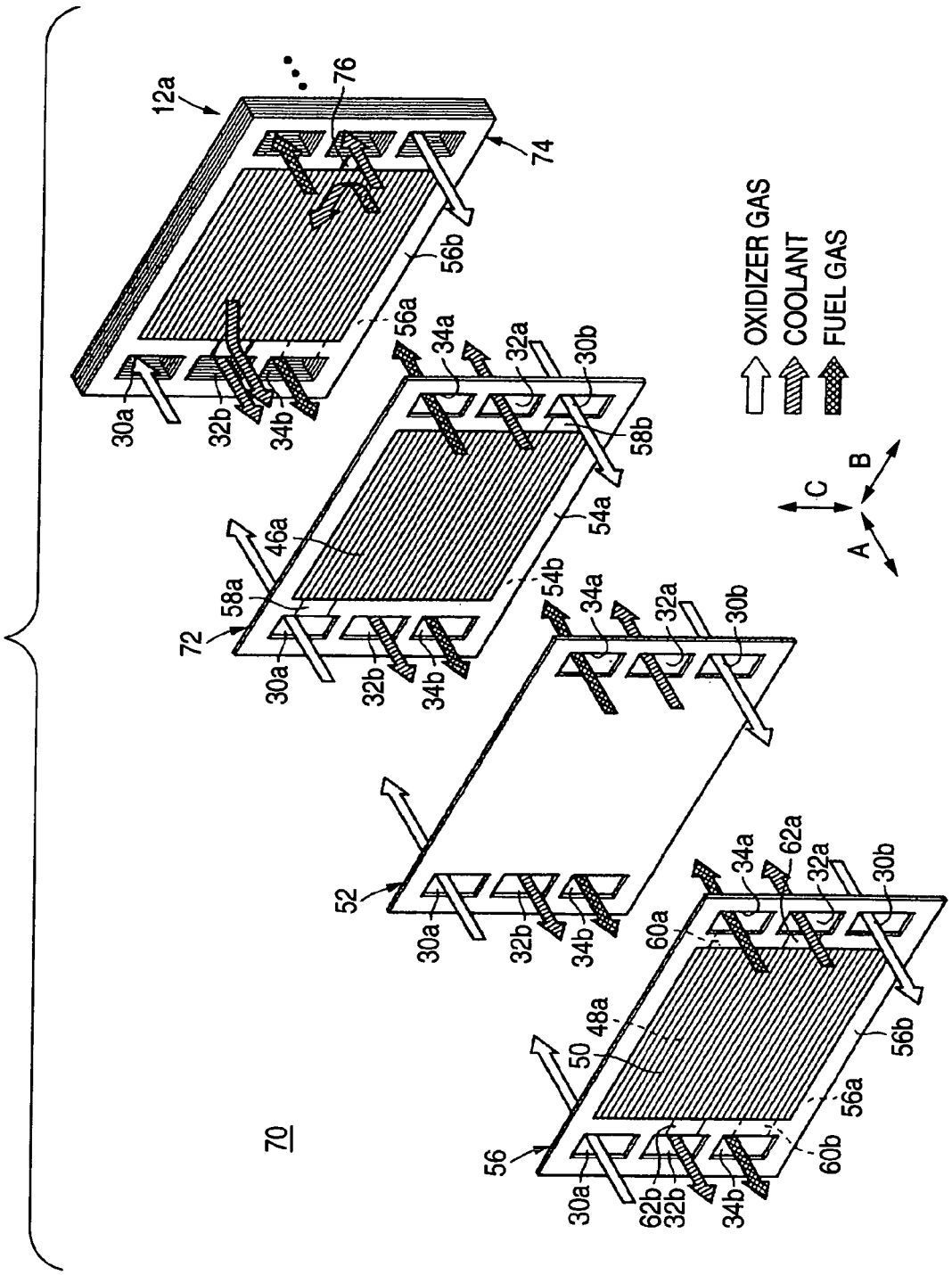
FIG. 4 is an exploded perspective view for explaining a dummy cell constituting the fuel cell stack according to a second embodiment of the present invention.

FIG. 4 is an exploded perspective view for explaining the configuration of a dummy cell 70 constituting a fuel cell stack according to the second embodiment of the present invention. In this embodiment, as for the same reference numerals referring to the same elements in the fuel cell stack according to the first embodiment, the detailed explanation thereof will not be given. In the third and fourth embodiments also, the detailed explanation will not given.

The dummy cell 70 includes first and second metallic separators 72, 56 which sandwich a conductive plate 52. The end cell 12a includes a second metallic separator 74. The second metallic separator 74 (or first metallic separator 72) includes a flow path resisting portion (flow rate limiting mechanism) 76 at a region communicating the coolant supplying communicating hole 32a with the coolant flow path 50.

The flow-path attenuating portion 76 is formed in a region narrower than the communicating region provided for each electricity-generating cell 12. The flow-path attenuating portion 76 may be formed at the region of the communicating portions between the coolant discharging communicating hole 32b and the coolant flow path 50, or otherwise at both regions of the communicating portions formed between the coolant flow path 50 and the coolant supplying communicating hole 32a, and between the coolant flow path 50 and the coolant discharging communicating hole 32b.

In the second embodiment thus configured, the coolant supplied to the coolant supplying communicating hole 32a is introduced into the coolant flow path 50 through the flow path resisting portion 76. Thereafter, the coolant flows in a direction of arrow B. In this case, since the flow path resisting portion 76 constitutes a narrow communicating region, the flow rate of the coolant supplied to the coolant flow path formed between the dummy cell 70 and the end cell 12a is reduced.

In this case, during the normal operation of the fuel cell stack, the coolant supplied between the dummy cell 70 and the end cell 12a mainly cools the end cell 12a. Therefore, the provision of the flow path resisting portion 76 prevents the end cell 12a adjacent to the dummy cell 70 from being cooled excessively.

Thus, in accordance with the second embodiment, in a simple configuration, the flow rate of the coolant can be surely limited. The low-temperature actuating performance and cooling performance during the normal operation can be also improved.

Figure 5:
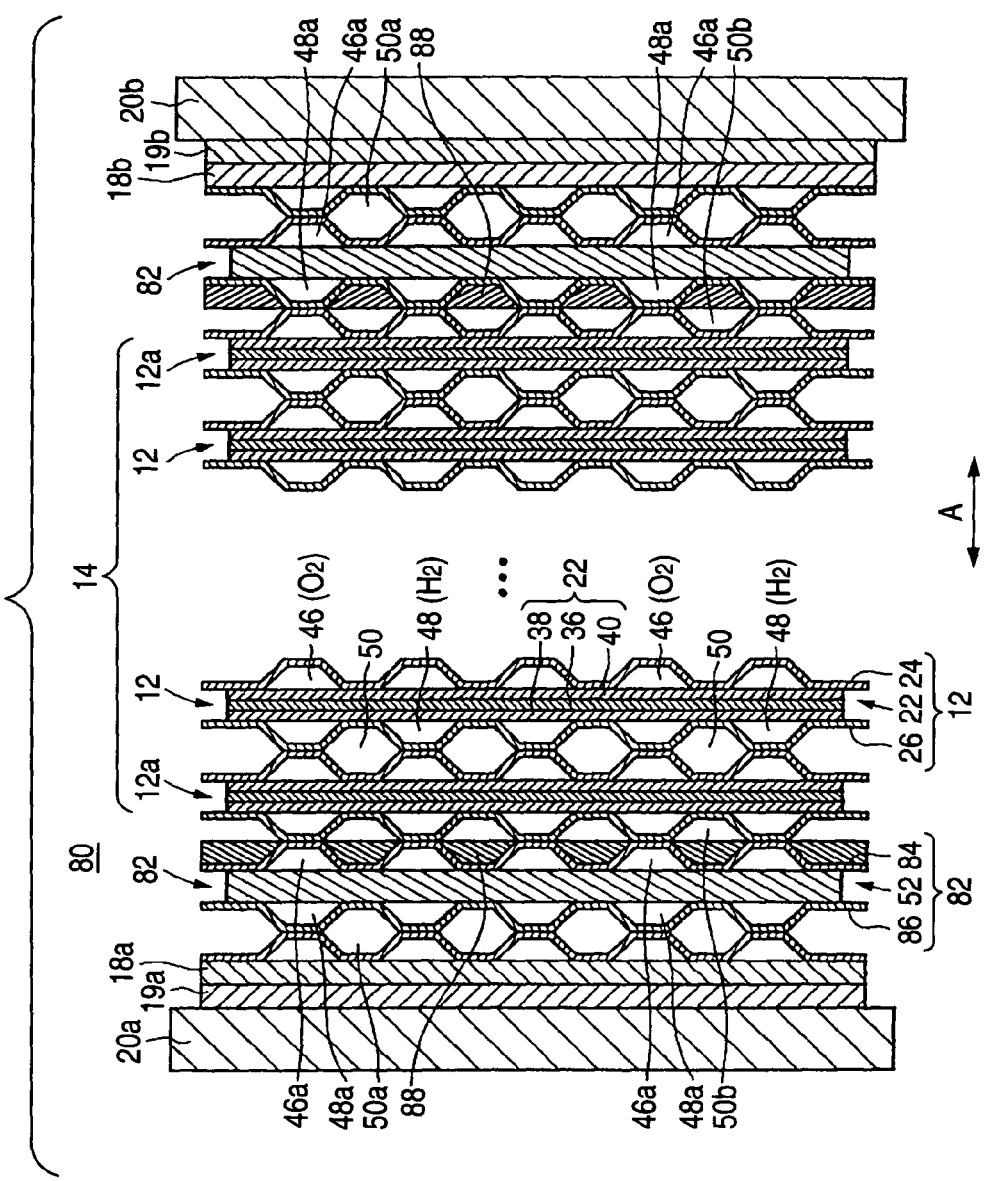
FIG. 5 is a schematic sectional view of the fuel cell stack according to a third embodiment of the present invention.

FIG. 5 is a schematic sectional view of the fuel cell stack 80 according to the third embodiment of this invention.

A dummy cell 82 constituting a fuel cell stack 80 includes first and second metallic separators 84, 86 which sandwich a conductive plate 52. As the first and second metallic separators 84, 86, the first and second metallic separators 24, 26 constituting the electricity-generating cell 12 are employed. A filling resin member 88 is formed in each of grooves of the coolant flow path 50b. The provision of the filling resin member 88 reduces the opening sectional area of the coolant flow path as compared with that of the coolant flow path 50 between the electricity-generating cells 12.

In accordance with the third embodiment of this invention, the flow rate of the coolant supplied to the coolant flow path 50b formed between the dummy cell 82 and end cell 12a is limited as compared with that of the coolant supplied to the coolant flow path 50 between the electricity-generating cells 12. Therefore, the end cell 12a adjacent to the dummy cell 82 is not cooled excessively, thereby providing the same advantage as the first embodiment. For example, in a simple configuration, the low-temperature actuating performance and cooling performance during the normal operation can be also improved.

Figure 6:
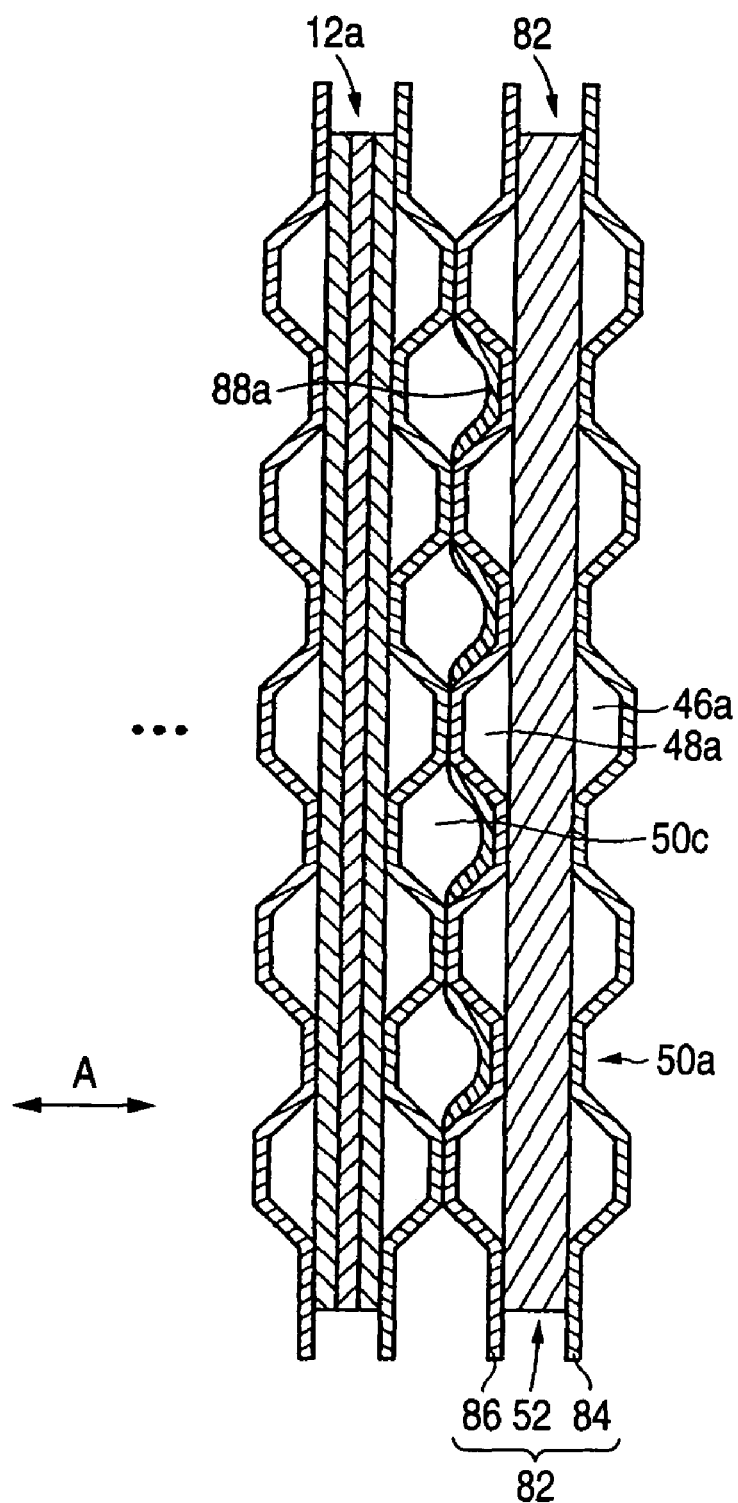
FIG. 6 is a partial sectional view for explaining the fuel cell stack in which another filling resin member is arranged.

As for the third embodiment, employing the filling resin member 88, the opening sectional area of the coolant flow path 50b is set to about half of that of the coolant flow path 50 formed between the electricity-generating cells 12. However, setting the opening sectional should not be limited to the half, but a desired opening sectional area may be determined accordingly. For example, as seen from FIG. 6, a filling resin member 88a may be provided along the shape of the coolant flow path 50c.

Figure 7:
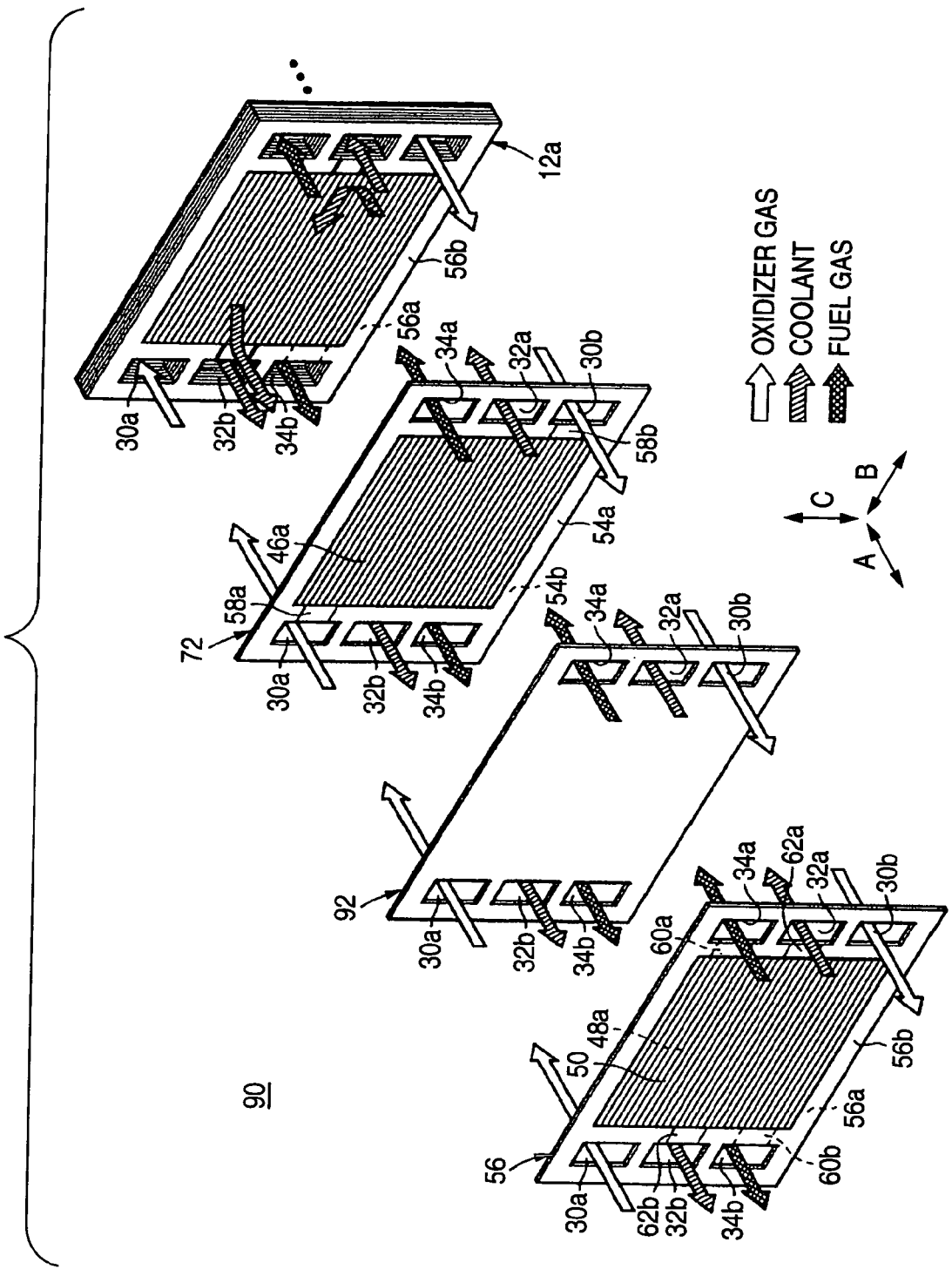
FIG. 7 is an exploded perspective view for explaining a dummy cell constituting the fuel cell stack according to a fourth embodiment of the present invention.
Figure 8:
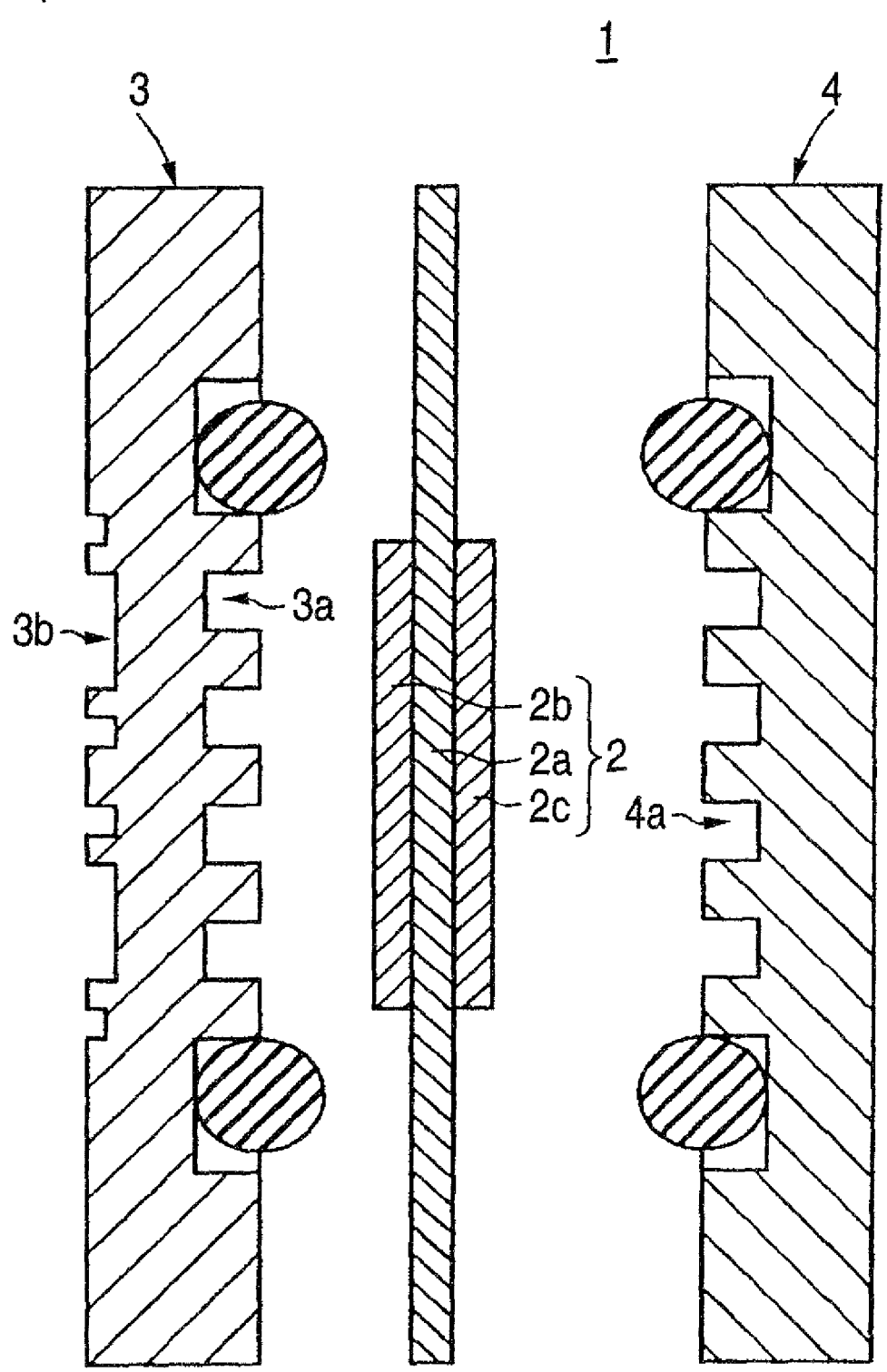
FIG. 8 is a partial sectional view of a solid-state polymer electrolyte type fuel cell disclosed in Patent Reference No. 1.

FIG. 7 is an exploded perspective view for explaining the configuration of a dummy cell 90 constituting the fuel cell stack according to the fourth embodiment of the present invention.

The dummy cell 90 includes a conductive plate 92 sandwiched by first and second separators 54, 56. The conductive plate 92 has a higher electric resistance than that of the first and second metallic separators 54, 56, and is made of e.g. nickel-chromium alloy.

In the fourth embodiment configured as described above, during the operation of the fuel cell stack, when a current flows through the dummy cell 90, the conductive plate 92 having a high electric resistance itself generates heat. Therefore, the end cell 12a can be heated preferably so that the time lag of temperature-rising of the end cell 12a can be prevented in secure way.

In the fuel cell stack according to the present invention, the dummy cell without the membrane electrode assembly does not produce water by electricity-generation of the fuel cell, and the dummy cell itself can be functioning as the heat-insulating layer. This structure effectively prevents the time lag of temperature-rising of the end cell when actuated at a low temperature and voltage drop of the end cell. In addition, the dummy cell includes the same separators as those of the electricity-generating cell of which arrangement enables the entire fuel cell stack to be structured economically as compared with the case using a dedicated heat-insulating plate.

What is claimed is:

1. A fuel cell stack including a stacked structure composed of a plurality of electricity-generating cells each having a membrane electrode assembly with a pair of electrodes arranged on both sides of the electrolyte, said membrane electrode assembly being sandwiched by separators, comprising:

a dummy cell arranged at least one end in a stacking direction of said stacked structure, said dummy cell including at least a conductive plate separate and distinct from the membrane electrode assembly of an electricity-generating cell and a pair of dummy cell separators which sandwich said conductive plate, wherein the dummy cell does not generate electricity, wherein no reactant gas is supplied on a surface of the pair of dummy cell separators, wherein said dummy cell separators sandwiching said conductive plate are identical to the separators sandwiching the membrane electrode assembly, and wherein said conductive plate is made from a first material having a first electric resistance, the dummy cell separators are made from a second material having a second electric resistance, the second material is different than the first material and the first electric resistance is higher than the second electric resistance.

2. A fuel cell stack according to claim 1, further comprising a coolant flow path formed by grooves on the faces of two separators where the grooves align to form the coolant flow path that is perpendicular to the fuel cell stacking direction, and a heat-insulating space corresponding to said coolant flow path is formed between the electricity-generating cell arranged at said one end of said stacked structure and said dummy cell.

3. A fuel cell stack according to claim 1, further comprising a first coolant flow path formed by grooves on the faces of two separators where the grooves align to form the first coolant flow path that is perpendicular to the fuel cell stacking direction, and a second coolant flow path formed by grooves on the faces of a dummy cell separator and a separator of the electricity-generating cell arranged at said one end of said stacked structure where the grooves align to form the second coolant flow path that is perpendicular to the fuel cell stacking direction, a flow rate limiting mechanism, connected to the second coolant flow path, is formed between the electricity-generating cell arranged at said one end of said stacked structure and said dummy cell.

4. A fuel cell stack according to claim 3, wherein said flow rate limiting mechanism comprises a flow path resisting portion located at an inlet or outlet of said second coolant flow path, wherein said flow-path resisting portion functions as a communicating portion whose region is narrower than that of a communicating portion of an inlet or outlet of said first coolant flow path formed between separators of said electricity-generating cells.

5. A fuel cell stack according to claim 3, wherein said flow rate limiting mechanism is arranged in said second coolant flow path and is provided with a filling member which reduces an opening sectional area of the corresponding coolant flow path as compared with that of the first coolant flow path disposed between separators of said electricity-generating cells.

6. A fuel cell stack according to claim 1, wherein the dummy cell separators and the insulating plate comprise at least one reactant gas supply communicating hole, one reactant gas discharging hole, one coolant supply communicating hole and one coolant discharge communicating hole.

7. A fuel cell stack according to claim 1, wherein said conductive plate has a shape that is identical to the shape of the electrolyte but is different than the shape of the dummy cell separators.

\* \* \* \* \*